Figure 1B:
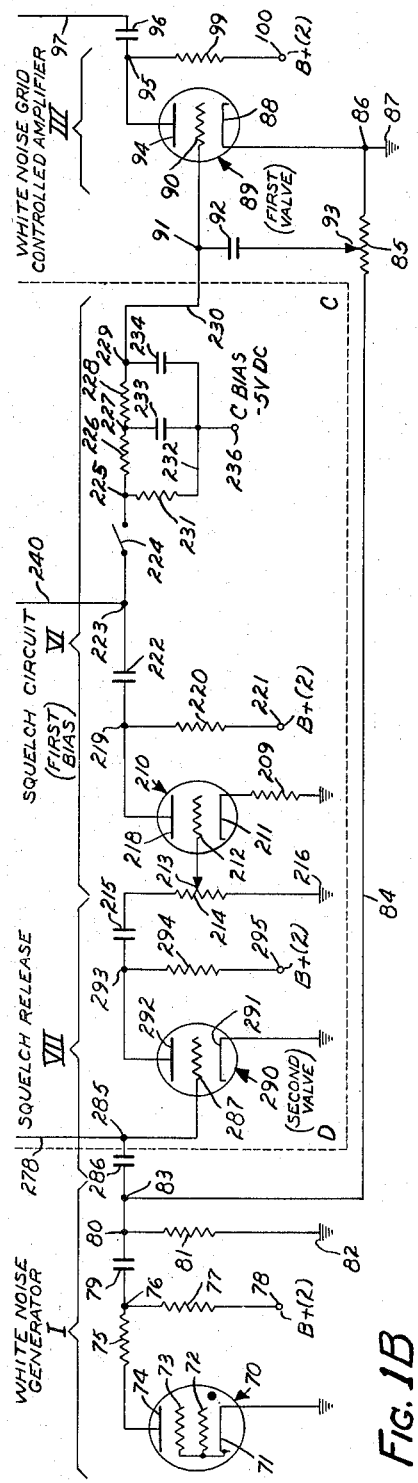

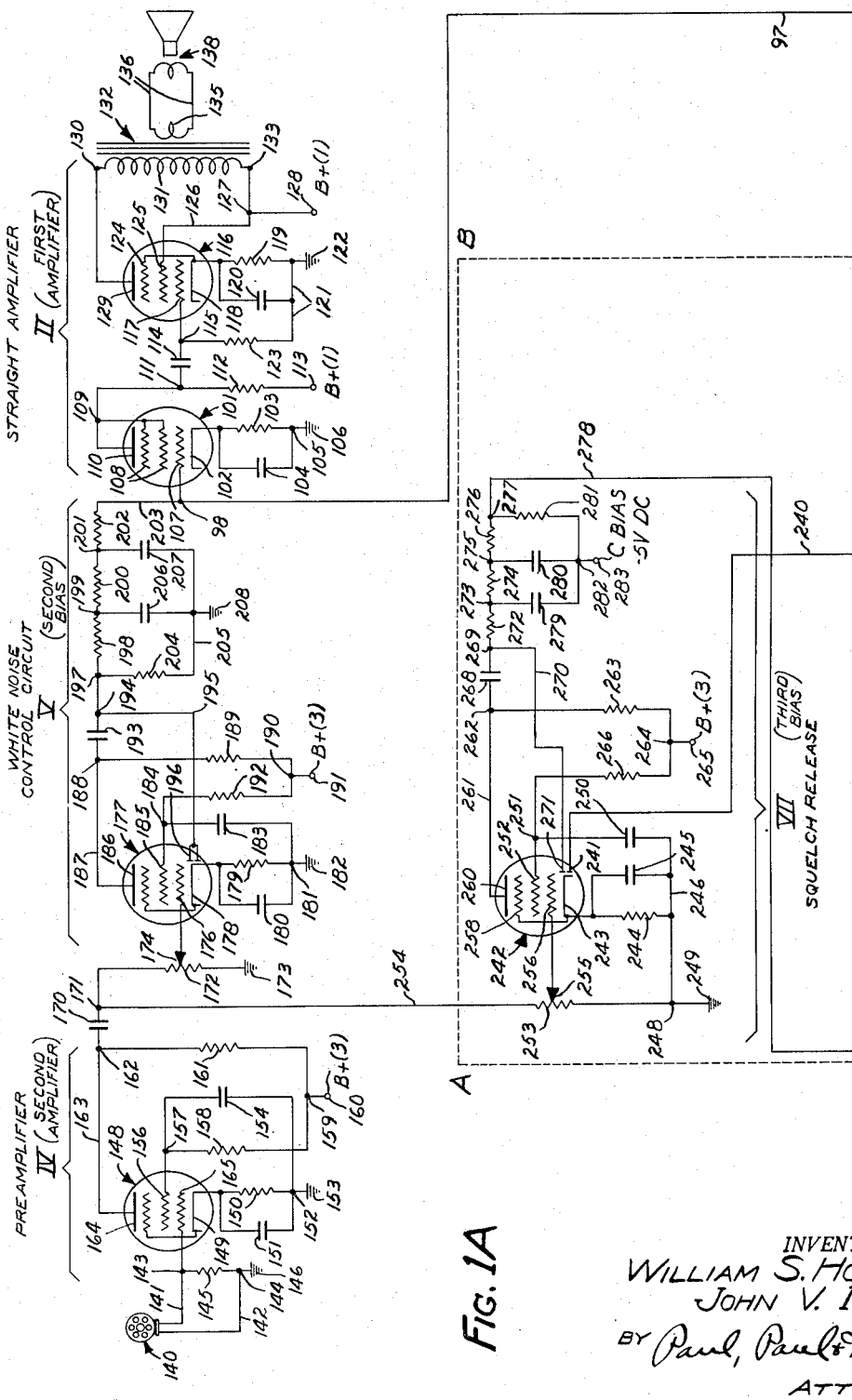

Jan. 5, 1954     W. S. HOWELL ET AL     2,664,649
APPARATUS FOR SPEECH INSTRUCTION
Filed March 9, 1951                                2 Sheets-Sheet 2

INVENTORS
WILLIAM S. HOWELL
JOHN V. IRWIN
BY Paul, Paul & Moore
ATTORNEYS

Patented Jan. 5, 1954

2,664,649

UNITED STATES PATENT OFFICE 2,664,649

APPARATUS FOR SPEECH INSTRUCTION

William S. Howell, Minneapolis, Minn., and John V. Irwin, Madison, Wis., assignors to Regents of the University of Minnesota, Minneapolis, Minn., a corporation of Minnesota Application March 9, 1951, Serial No. 214,668

8 Claims. (Cl. 35—35)

This invention relates to apparatus for use in speech instruction. In the teaching of speaking, one of the problems confronting the instructor is that of teaching the pupil to speak distinctly and forcibly. In most speaking situations, it is essential for the speaker to be able to speak in a sufficiently loud voice to overcome background noise, as before an audience. Accordingly, for adequate instruction in speech, it is essential that the student be provided with adequate training by means of which he or she will obtain proper speech habits, thus enabling the student to deliver audibly and intelligibly the spoken material, notwithstanding considerable background noise.

In the practical field of speech instruction there has heretofore been available no way for enabling instruction of the student in respect to voice level, except for the student to speak before groups where the student, in effect, practices, the group providing the noise level over which the student must speak. Obviously, the student has few opportunities thus to obtain training because of the lack of audiences before whom to make the practice speeches. This method of speech instruction can be carried out with some success in speech classes where each student in turn takes his place before the group for purposes of delivering the address, the remainder of the class meanwhile serving as the audience and serving to provide the level of background noise over which the student must speak. Another mode of training has been to provide the student with a microphone and amplifying system, together with meters indicating the decibel level of sound strength. The idea when using such equipment is that the student is able to watch the sound level produced by his spoken voice and thus increase the sound level to a prescribed amount.

The disadvantage when using such modes of instruction has been that the system requires coordination by the student of the sound level of spoken voice against the sound level indication on the decibel scale, and unless the student continuously gives attention to the sound level on the decibel scale, it not infrequently happens that the student's voice will gradually decrease without the decrease being noted. Stated another way, there is no positive and forceful indication to the student of the deficiency in level of voice sounds delivered.

It is an object of the present invention to provide an apparatus for providing a background noise over which the student must speak during voice instruction.

It is a further object of the invention to provide an apparatus of self-regulatory character productive of a background noise while the student is speaking and over which the student must speak during practice.

It is a further object of the invention to provide an apparatus for voice instruction wherein a background noise is generated, and wherein the background noise is amplified and produced in the presence of the student, together with control apparatus for discontinuance of the background noise when the student's voice level is of sufficient magnitude.

It is another object of the invention to provide an apparatus for speech instruction capable of generating and producing a background noise while the student is speaking, when the student's voice level is below a prescribed minimum, but which blanks out the background noise when the student is not speaking at all or when, if speaking, the student's voice level is above a prescribed minimum.

Other and further objects of the invention are those inherent in the method and apparatus herein illustrated, described and claimed.

Figure 2:
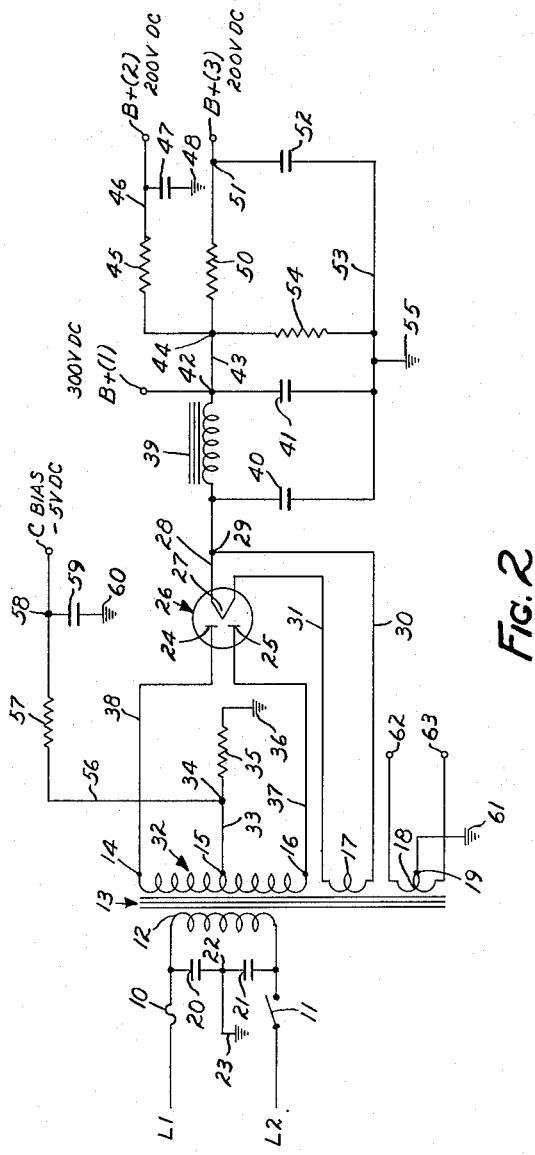

The invention is illustrated with reference to the drawings in which corresponding numerals refer to the same parts and in which Figures 1A and 1B, combined, are a wiring diagram of a representative apparatus of the instant invention;

Figure 2 is a wiring diagram of the power pack serving the apparatus shown in the wiring diagram of Figures 1A–1B.

Referring to the drawings, particularly in Figure 2, there is shown a power pack which furnishes the anode-cathode potential supplies and bias voltage for the various electronic circuits of Figures 1A and 1B. The power pack is energized through alternating current supply lines $L_1$ and $L_2$ which feed through a fuse 10 and switch 11 to the primary winding 12 of a transformer generally designated 13 having a secondary coil generally designated 32. The secondary 32 has terminals 14 and 16 and a center tap 15. Another secondary 17 serves the filament cathode of the full wave valve 26 and still another secondary coil 18 provided with a center tap 19 serves the heater filaments of the various electron tubes in Figures 1A and 1B. The primary 12 is bridged by condensers 20 and 21 connected in series, their center connection 22 being grounded at 23 for phase correction. The alternating current secondary potential across the coil terminals 14 and 16 is applied to the anodes 24 and 25 of a two-element rectifier generally designated 26. The cathode 27 of the tube 26 is connected through lines 28, junction 29 and line 30 to one terminal of the filament secondary 17 and through line 31 to the other terminal of the secondary. Accordingly, when the switch 11 is closed and the transformer 13 is energized, the alternating current potential produced in the secondary 14—15—16 is applied between the heated cathode 27 and the anodes 24 and 25 alternately. The anode circuit from 24 extends through line 38 to terminal 14 of the coil 32, whence the circuit continues through one half of the secondary coil to tap 15 and thence over line 33, junction 34, resistor 35 to ground 36. From anode 25 the circuit extends via line 37 to terminal 16 and thence through the other half of the transformer secondary 32 to the center tap 15 and to ground as previously described. The resultant rectified potential between ground 36 and terminal 29 is applied via line 28 through the filter network consisting of an inductance 39 and grounded condensers 40 and 41 to the terminal 42 which extends to terminal labeled B+(1). From the junction 42 a circuit extends at 43 to the junction 44, whence the circuit extends through resistor 45 and line 46 to the terminal B+(2), this terminal being connected through condenser 47 to the ground 48. From junction 44 a circuit also extends through resistor 50 and through terminal 51 to the junction B+(3). Junction 51 is connected through condenser 52 to the ground bus 53. Junction 44 is connected to the ground bus through a resistor 54, the ground bus being grounded at 55. From junction 34 line 56 extends through resistor 57 and junction 58 to the terminal C, which provides bias potential, the junction 58 being connected through a condenser 59 to the ground at 60. The transformer secondary 18, the center point of which is grounded at 61, provides a low alternating current voltage at the terminals 62 and 63 which serve to supply alternating current potentials to all of the cathode heater filaments, not illustrated, of the thermionic tubes shown in Figures 1A–1B.

The terminal B+(1) in the illustrated modification provides approximately 300 volts D. C. whereas terminals B+(2) and B+(3) each provide a potential of approximately 200 volts D. C., the two separately filtered terminals being provided for circuit isolation. The terminal C provides a bias potential of approximately —5 volts, with reference to the ground potential 36. Between terminals 62 and 63 there is approximately 6–6½ volts alternating current. Obviously, the illustrated potentials may be varied in other specific circuit designs within the purview of the invention.

Referring to the wiring diagram, Figures 1A and 1B, at 70 there is illustrated a gas-filled tube of the thyratron type having heated cathode 71, a pair of grids 72 and 73 connected together, and an anode 74. The anode is connected through resistor 75 to junction 76 which in turn is connected through resistor 77 to terminal 78 that is connected by a line, not shown, to the B+(2) terminal of the power pack in Figure 2. Junction 76 is connected through a capacitor 79 to junction 80 which is connected through resistor 81 to the ground 82. Junction 80 is connected through junction 83 and line 84 and thence through resistor 85 to junction 86 which is grounded at 87. Junction 86 is connected to the heated cathode 88 of an amplifier tube 89, the grid 90 of which is connected to junction 91, which is in turn connected through a condenser 92 to a variable tap 93 on resistor 85. The anode 94 of the amplifier tube 89 is connected through junction 95 and condenser 96 and thence via line 97 to junction 98, see diagram 1A. Junction 95 (diagram 1B adjacent tube 89) is connected through a resistor 99 to the terminal 100 which is connected to the B power supply terminal B+(2).

The bracket over the thyratron tube 71 and adjacent circuits, labeled I, indicates generally the "white noise" generator. The designation "white noise" is used because the operation of the tube 70 produces a signal containing a very wide range of frequencies in the audible range, and the signal therefrom is a firm and quite annoying sound having a wide range of audible frequency components. This signal is carried through the amplifier 89 and thence through a two-stage amplifier shown under the bracket II of Figure 1A. The two-stage amplifier includes an amplifier tube 101 having a heated cathode 102 that is connected through a resistor 103 and condenser 104, in parallel, to junction 105, which is grounded at 106. The control grid 107 of the tube 101 is connected to the input signal terminal 98, previously mentioned, and the two screen grids 108 of the tube 101 are connected to junction 109 on the circuit of anode 110. From junction 109 a circuit extends through junction 111 and resistor 112 to terminal 113 which is connected to the power supply terminal B+(1). The terminal 111 is connected through a coupling condenser 114 to the grid terminal 115 of the second stage amplifier tube 116 having the control grid 117. The heater cathode 118 of amplifier 116 is similarly connected through a resistor 119 and condenser 120, in parallel, to the ground bus 121 which is grounded at 122, it being noted that from junction 115 on the grid terminal a circuit also extends through the leakage resistor 123 to the same ground bus 121. One of the screen grids 124 of the amplifier 116 is internally connected to the cathode 118. The other screen grid 125 is connected through line 126 to junction 127 which is in turn connected to the B+(1) supply terminal 128. The anode 129 of the tube 116 is connected to one of the terminals 130 of winding 131 of an impedance matching transformer generally designated 132, the other terminal 133 of said transformer being connected to junction 127. The secondary 135 of the transformer is connected by a pair of lines 136 to the loud speaker at 138. Accordingly, when power is supplied to the circuits, the white noise generator shown under the bracket I generates a sound signal, which is applied through the white noise grid control amplifier 89 shown generally under the bracket III and thence through line 97 to the two-stage amplifier shown under the bracket II and the output thus amplified is impressed upon the loud speaker 138, thus producing an audible sound. The white noise sound level may be varied conveniently by varying the position of adjustable tap 93 on resistor 85.

The microphone into which the student speaks during training is illustrated generally at 140 and has a pair of output leads 141—142 connected to terminals 143 and 144 of resistor 145, the terminal 144 being grounded at 146. The microphone input is carried to a preamplifier shown generally under the bracket IV, the preamplifier consisting of a single stage thermionic amplifier tube generally designated 148. The tube 148 has an indirectly heated cathode 149 which is connected through resistor 150 and condenser 151 in parallel to ground bus 152, which is grounded at 153, the ground bus being also connected through condenser 154 to one of the grids 156 of the tube. On the lead of grid 156 there is provided terminal 157 which is connected through the resistor 158 and junction 159 to the B+(3) terminal 160, the terminal 159 being in turn connected through resistor 161 to terminal 162 on the anode line 163 connected to the anode 164 of the amplifier tube. Control grid 165 of the amplifier is connected to the input terminal 143 from the microphone. The voice signal produced in the microphone 140 is accordingly amplified and the alternating current component of it is transferred by a condenser 170 which is connected to terminal 162 and to the terminal 171. The terminal 171 is connected through a resistor 172, which is grounded at 173. The resistor 172 is provided with an adjustable tap 174 so that a portion of the amplified voice signal can thereby be impressed upon the control grid 176 of an amplifier tube generally designated 177 which forms a part of the white noise control circuit shown generally under the bracket designated V.

The white noise control circuit V includes the tube 177 which is not only an amplifier but also has a pair of anodes adjacent the cathode thereof for the purpose of rectification as will be explained. The tube 177 has an indirectly heated cathode 178 which is connected through a resistor 179 and a condenser 180 to the ground bus 181 which is grounded at 182, the ground bus being connected also through the condenser 183 to the terminal 184 of the lead extending from the grid 185 of the tube 177. The anode 186 of the tube 177 is connected through line 187 to junction 188 which is in turn connected through the resistor 189 to the terminal 190 which is connected to the input post 191 that is in turn connected to the B power supply terminal B+(3). The terminal 190 is also connected through resistor 192 to junction 164.

Junction 188 is connected through a condenser 193 to junction 194 which is connected back through the line 195 to a pair of anodes 196 situated within the tube and adjacent the heated cathode 178. The junction 194 is connected through junction 197 and then through resistor 198 and junction 199 and thence through resistor 200 and junction 201, resistor 202, to line 203 which is connected to junction 98 of the grid lead of amplifier tube 101 of the amplifier shown under the bracket II. From junction 197, previously mentioned, a circuit extends through resistor 204 to ground bus 205. Likewise, from junctions 199 and 201 circuits extend through condensers 206 and 207, respectively, to the same ground bus 205, the ground bus being grounded at 208.

Assuming that the white noise generator shown under the bracket I is operating as previously described and that the signal thereby generated is transferred through line 84, variable control resistor 85—93, the white noise grid control amplifier III (tube 89) thence through line 97 and through the two-stage amplifier under the bracket II to the loud speaker 138, such noise signal will be impressed upon the loudspeaker 138 and produce a loud noise. If under such circumstances the student's voice waves are impressed upon the microphone 140 the voice signal thereby produced will be transferred through the condenser 170 and through the variable resistor 172—174 to the grid of tube 177 of the white noise control circuit V. The output of tube 177 is an alternating current wave at 188 which is impressed through the condenser 193 upon the terminal 194, only the alternating current component of the signal 188 being thus impressed at terminal 194. This alternating current component is rectified by virtue of the connection back to line 195 to the rectifying anodes 196 which are in rectifying relationship to the cathode 178 of the tubes 177 and accordingly a rectified potential builds up through the network composed of resistors 200 and 202 and is filtered by virtue of resistor 204 and capacitors 206 and 207 so that as a result a negative D. C. voltage component will appear on line 203 which may be as much as 40 or 50 volts negative. Such rectified component causes the entire circuit consisting of line 203, junction 98 and line 97, as well as grid 107 of the tube 101 to become sufficiently negative so that the tube 101 is biased to non-conductive condition, and accordingly the white noise signal which is impressed as previously described through line 97 upon the grid of tube 101, produces no conductivity in tube 101, even though some such signal may still be impressed upon such circuit in normal strength. This is due to the negative condition of line 203.

The degree to which the line 203 is made negative depends upon the strength of the voice signal produced at microphone 140, and the effective portion of the voice signal, which is varied by adjustment of the resistor 172—174. Accordingly, once the resistor 172—174 is adjusted there is thus established a predetermined circuit setting and the value of voice signal produced by the speaker's voice must be sufficient so that the selected portion thereof (resistor 172—174), when amplified and rectified will produce requisite negative condition of line 203 and hence of grid 107 to render tube 101 non-conductive. By thus speaking sufficiently loud, the speaker blanks out the white noise. However, if the speaker's voice is not loud enough, the negative bias at line 203 is less negative and hence the white noise sound is produced at the loud speaker 138. Therefore, the student is provided with a distinct audible prodding whenever the student's voice decreases below a prescribed level and the student is thereby instantly reminded to increase the voice level. This accomplishes a distinct value in teaching the student to maintain sufficient voice level.

In the system thus far described, when no voice signal is produced by the microphone 140, a white noise signal is produced at the loud speaker 138 and accordingly when the student pauses, as he should and must for effective speaking, the white noise is instantly reproduced during and continuously throughout such pause. It is perfectly possible to use the instrument in such condition, although the white noise thus produced during the pauses is slightly annoying. The student, however, can become accustomed to this condition of operation of the instrument, and the instrument therefore serves a useful function even with this mode of operation.

However, for preferred results it is desirable to suppress the white noise during those natural and desirable pauses which may properly occur during any speech. For this purpose there is provided a control arrangement shown within the box outlined with dotted lines and extending partly in Figure 1A and partly in Figure 1B, the box being denoted by the corners A—B—C—D. Within the box there are two main circuit components, a "squelch circuit" shown generally under the bracket VI and a "squelch release circuit" which has a portion over the bracket VII in Figure 1A and under the correspondingly numbered bracket VII in Figure 1B, the two portions adjacent the two brackets VII being considered together. The "squelch circuit" portion shown under the bracket VI comprises a grid controlled amplifier tube generally designated 210 having indirectly heated cathode 211 that is connected through a resistor 209 to ground, a control grid 212 which is connected to a variable tap 213 on resistor 214. The resistor 214 is connected to one side of a transfer condenser 215 to which reference will hereinafter be made and the other end of the resistor is grounded at 216. The signal which controls the potential of grid 212 is selected by varying the position of variable tap 213 on the resistor 214. The anode 218 of tube 210 is connected to junction 219 which is in turn connected through resistor 220 to the terminal 221 that is connected to the B supply terminal B+(2). Junction 219 is connected through condenser 222 to junction 223 and thence through a manual switch 224 which may be open or closed manually, and through a filter circuit extending from junction 225 through resistor 226 and junction 227 and resistor 228 and junction 229 to line 230, which is in turn connected to the junction 91 on the grid lead of grid 90 of the white noise control amplifier III, previously mentioned. From the junction 225 on the filter circuit, a circuit extends through resistor 231 to the bus 232. Likewise, from junctions 227 and 229, circuits extend through condensers 233 and 234, respectively, to the bus 232. The bus 232 is connected to the terminal 236 which is in turn connected to the —5 volt C bias terminal of the power supply shown in Figure 2.

From terminal 223 it will be noted that a circuit extends via line 240 on Figure 1B and thence through the same correspondingly numbered line 240 on Figure 1A to an anode 241 of a combined amplifier and rectifier tube generally designated 242. The tube 242 has a cathode 243 which is indirectly heated and is connected through a resistor 244 and condenser 245 in parallel to the ground bus 246 which is connected through ground junction 248 to ground 249. From the ground bus a circuit also extends through condenser 250 to terminal 251 on the lead of grid 252 of tube 242. From ground terminal 248 a circuit extends through resistor 253 and thence through line 254 to terminal 171 of condenser 170 previously described. From the variable tap 255 on resistor 253 a circuit extends to the control grid 256 of the tube 242. A screen grid 258 of the tube 242 is internally connected to the cathode 243. The anode 260 of the tube 242 is connected via line 261 to junction 262 which is in turn connected through resistor 263 to junction 264 and thence to the terminal 265 which is connected by line not shown to the B+(3) power supply terminal of the power pack shown in Figure 2. From the junction 251 on the lead of grid 252 of tube 242 a circuit extends through resistor 266 to the B power supply terminal 264. The signal at 262 is transferred via coupling condenser 268 to the terminal 269 which is connected via line 270 to another rectifying anode 271 adjacent the cathode 243 of tube 242. From the junction 269 a filter circuit extends via resistor 272, junction 273, resistor 274, junction 275, resistor 276 and junction 277 to line 278 upon which a filtered D. C. potential appears, under certain conditions of operation of the circuit, as hereinafter described. The filter circuit also includes a pair of condensers 279 and 280 connected in parallel to the junctions 273 and 275, respectively, and a resistor 281 connected to the junction 277. One side of each of the condensers 279, 280 and resistor 281 are connected together at junction 282 which is in turn connected to —5 volt C bias terminal 283 of the power supply shown in Figure 2.

The line 278, upon which a negative control voltage appears under certain conditions of operation, extend from Figure 1A to Figure 1B and is connected to terminal 285 that extends through the coupling condenser 286 to terminal 83, previously mentioned, of white noise generator I. The terminal 285 is also connected to the control grid 287 of amplifier 290 in the "squelch release" circuit shown generally under portion VII of Figure 1B. The amplifier 290 includes an indirectly heated cathode 291 and an anode 292 which is connected through junction 293 to one side of the coupling condenser 215 previously mentioned, the junction 293 being connected through a resistor 294 to the terminal 295 which is served by the power supply terminal B+(2) of the power pack shown in Figure 2.

If it is assumed for the moment that the potential of grid 287 of the "squelch release" control tube 290 has a sufficiently high voltage so that the tube 290 is conducting, it will then follow that the signal produced by the white noise generator shown under the bracket I and transferred by the coupling condenser 286 to the grid 287 will cause an output at the anode 292 of the tube 290 shown under the bracket VII of Figure 1B. The output voltage of anode 292 is of mixed frequency alternating voltage of the white noise signal, together with a direct current component. The alternating current component of such signal is transferred via the coupling condenser 215 to the resistor 214 and a portion of such signal is thereby impressed upon the grid 212 of the tube 210, which accordingly likewise becomes conductive and produces an amplified signal of the same character at its anode terminal 219. The signal at 219 therefore consists of alternating components of varying frequency corresponding to the signal generated by the white noise generator I, together with a direct current component. Such mixed frequency alternating voltage signal is transferred via the coupling condenser 222 to the terminal 223. If it is assumed that the switch 224 is closed, such signal is rectified due to the connection via line 240 to the rectifying anode 241 of the tube 242, see Figure 1A, over the bracket VII. The thus rectified signal at terminal 223 is filtered by the network 225—234 and there appears at terminal 229 a smooth, negative D. C. voltage signal, the value of which in the negative direction is proportional to the white noise signal input. This output at terminal 229 may be adjusted in magnitude by varying the setting of the variable tap 213 on resistor 214 and is adjusted to a value sufficient such that the negative signal at terminal 229, as impressed through line 230 and junction 91 upon the grid 90, holds the grid 90 sufficiently negative so that the tube 89 does not conduct. Accordingly, the circuit components under the brackets VII and VI of Figure 1B serve to interrupt or "squelch" the operation of the control amplifier tube under the bracket III in Figure 1B, and therefore no usable signal is produced at the output of tube 89 under the bracket III and hence the white noise does not appear at the loud speaker 138.

Such operation, however, depends upon the voltage applied to the control grid 287 of the tube 290 shown under the bracket VII of Figure 1B. When the grid 287 becomes negative, tube 290 no longer conducts and this decreases or interrupts the operation of tube 201 and accordingly the negative output at terminal 229 is less negative and when sufficiently less negative the tube 89 again becomes conductive. The voltage condition of the grid 287 is hence a controlling condition and such voltage is determined by the "squelch release circuit" shown adjacent the bracket VII of Figures 1A and 1B. This circuit has a signal input which is the amplified voice component from microphone 140, this signal input voltage being impressed upon the resistor 253 and a selected portion thereof impressed upon the control grid 256 of the tube 242. Accordingly, when the student speaks into the microphone 140 and produces a voice signal, a portion of the amplified voice signal, the amount of which may be varied either by speaking or by selecting a varying resistor 253, is impressed upon the grid 256 of the grid 242. When the tube 242 conducts, it produces at its anode terminal 262 an amplified signal of a voice signal frequency, together with a D. C. component. The voice frequency component is transferred by coupling condenser 268 to terminal 269 and such alternating current voice frequencies are rectified by virtue of the connection to the rectifying anode 271 within the tube 242. The rectified voice frequencies thus at terminal 269 are filtered via the network between junctions 269, 277 and 282, and the filtered rectified voice frequency output accordingly appears at terminal 277 and is impressed by a line 278 upon junction 285, which is the terminal of the control grid 287 of tube 290 in Figure 1B. The greater the voice signal the more negative will become the rectified filtered output at terminals 277, line 278 and junction 285, which is impressed upon the grid 287. Therefore, when the speaker speaks in a sufficiently loud voice, a large negative signal will be produced at grid 287 and accordingly tube 290 does not then conduct, with the result that the white noise signal does not transfer through the tubes 290 and 210 and the filtered rectified output thereof does not become available at terminals 229 and hence tube 89 of control amplifier III does conduct the white noise signal which is impressed from junction 83 via line 84, control resistor 85—93 and then through tube 89 upon line 97 and this signal is accordingly impressed upon the line 97 connected to control grid 107 of the tube 101.

It might be supposed that this is just the converse of the operation desired, but it will be remembered that while the speaker speaks in a sufficiently loud voice, the white noise control circuit shown under the bracket V of Figure 1A under such conditions does produce a large negative voltage output at line 203 and such negative voltage output pulls the grid 107 of the tube 101 (under amplifier II, Figure 1A) sufficiently negative so that the tube 101 does not conduct, regardless of the white noise signals which may be impressed thereon through line 97. Therefore, so long as the student is speaking sufficiently loudly, no sound is produced at the loud speaker 138.

However, in the event the student stops speaking entirely, the voice signal which is impressed upon tube 242 over bracket VII, Figure 1A, accordingly does not exist, and junction 277 of the filter network becomes more positive with the result that the white noise signal at 285 is permitted to be impressed upon grid 287 so as to cause tube 290 to become conductive. When this occurs tube 210 also becomes conductive and the resultant signal, which is rectified through the filter network between junctions 225, 229 and 236 is the motivating factor by which the grid 90 of the tube 89 is caused to become more negative, thus causing tube 89 to become nonconductive. Consequently, when the student does not speak at all, the loud speaker does not produce any sound.

However, it may be assumed that there is a middle condition when the student is speaking but not sufficiently loudly enough. When this occurs the amplified microphone output which is amplified through tube 177 (under bracket V of Figure 1A) produces a rectified filtered, negative signal at line 203, but such signal is not so greatly negative as previously mentioned. At the same time the lesser amplified microphone signal impressed upon the tube 242 (of network VII, Figure 1A) likewise produces a lesser negative filtered output at terminal 277 and tube 290 may or may not conduct, depending upon how much negative the terminal 277 may be. The amount that such signal is negative is determined in final analysis by the adjustment of the resistor 253—255, Figure 1A. Accordingly, the instrument may be adjusted by speaking in a low volume and gradually adjusting the resistor 253—255 until at such low volume the white noise signal output is heard through the loud speaker 138. The setting of the resistor 253—254 accordingly determines the minimum voice loudness below which the white noise will be heard over the loud speaker. When the student's speaking voice drops below this minimum the loud speaker emits the white noise signal, thus instantly reminding the student to speak in a louder voice. When the student does thus speak up the network V interrupts the white noise signal produced at the microphone.

In utilizing the apparatus the following adjustments are made:

After the instrument is warmed up by turning on power, the microphone is put down so that it will be quiet and the rheostat 213—214, shown in Figure 1B between tubes 290 and 210, is then adjusted until the white noise disappears. This adjustment permits the circuit to operate so as to obliterate the white noise signal when there is no microphone signal. Next the microphone is placed in operative position and the student speaks into the microphone in low volume and while so speaking the rheostat 253—255 (adjacent tube 242 in Figure 1A) is adjusted until the white noise just reappears at the loud speaker 138. Then while speaking in a full voice the rheostat 172—174 is varied as desired. The rheostat 172—174, for practical operation, is the only control that needs adjustment. This rheostat determines how loud the student must talk in order to overcome the white noise produced at the loud speaker 138.

When switch 224, Figure 1B, is opened, the first described operation will ensue, that is to say the white noise control circuit shown under the bracket V will obliterate the white noise whenever the student speaks in a sufficiently loud voice, but when the student is not speaking the white noise will reappear at the loud speaker 138, as during pauses. When the switch 224 is closed and there is no voice sound into the microphone 140 with the adjustment as previously made, there is no white noise at the loud speaker 138. When the student speaks, but speaks in too low a tone, white noise will appear at the loud speaker 138, but when the student speaks and speaks above a predetermined loudness, the white noise is suppressed.

The tubes 177 and 242 are combination tubes in which rectifying anodes 196 of tube 177 and 271—241 of tube 242 are included. If desired, separate rectifying tubes may be provided.

For purposes of ready nomenclature in some of the claims the white noise amplifier III is called the first amplifier; the preamplifier IV is called the second amplifier; the squelch release network VI is called the first bias; the white noise control network V is called the second bias; the tube squelch release network over bracket VII in Figure 1 is called the third bias; tube 89 is called the first valve and tube 290 is called the second valve.

As many apparently widely different embodiments of this invention may be made without departing from the spirit and scope thereof, it is to be understood that we do not limit ourselves to the specific embodiments herein.

What we claim is:

1. An apparatus for teaching speech comprising electronic means for generating a noise signal of mixed frequencies in the audio range, amplifying means connected thereto and sound reproducer means connected to the amplifying means for producing an audible noise corresponding to said noise signal, a microphone, means connected to the microphone and responsive to the level of signal produced by said microphone for forming a biasing signal, the level of which varies with the level of signal from said microphone, said means for producing a biasing signal being connected to said amplifier for biasing said amplifier to minimum output when the microphone signal exceeds a predetermined amount and for relieving said bias of said amplifier when the microphone signal does not exceed said minimum amount.

2. An apparatus for instruction in speaking comprising electronic tube means for generating a noise signal of mixed frequencies in the audio range, an amplifier connected thereto for amplifying said noise signal, a sound reproduced connected to the amplifier for producing a sound corresponding to said noise signal, a microphone, another amplifier means connected to said microphone for producing an amplified voice signal when the microphone is operated, a rectifying-filter network connected to the second mentioned amplifier for producing a bias voltage, the magnitude of which is proportional to the magnitude of said voice signal, said biasing signal being connected to the first mentioned amplifier for biasing said amplifier to minimum output when the microphone signal exceeds a predetermined amount and for permitting operation of said first mentioned amplifier and the production of noise sounds in the audio range when said microphone signal is below said predetermined amount.

3. An apparatus for instruction in speaking comprising means including a source of mixed frequency for generating an electrical signal in the audio range, a first amplifier connected thereto for amplifying said signal, a speaker connected to said first amplifier for producing a noise signal corresponding to audio-range signal, a first signal suppression network also connected to said source of mixed frequency signals for producing a bias signal, said network being connected to said amplifying means for normally suppressing operation of said amplifier, a microphone for producing a voice frequency signal, a second network connected to said microphone for producing another bias signal for suppressing production of said noise signal when the microphone voice frequency signal exceeds a predetermined amount, a third network connected to said microphone for producing a biasing signal when said microphone is operated to produce a voice frequency signal, said third network being connected to the first network for suppressing the biasing function of the first network when said microphone produces said voice frequency signal.

4. The apparatus of claim 3 further characterized in that each of said networks comprises a thermionic tube for amplifying the signal imposed thereon, a rectifier for rectifying said signal, a filter network for smoothing the thus rectified signal.

5. An apparatus for speech instruction comprising thyratron thermionic means for generating a noise signal in the audio range, a first grid control thermionic valve connected thereto for valving the transmission of said signal, amplifier means connected to said valve and a sound reproducer connected to said amplifier means, a second thermionic valve also connected to said generator and a first bias voltage network having an output connected to the first thermionic valve for normally biasing said valve to non-conducting condition, a microphone having an amplifier connected thereto for producing amplified voice frequency signals, a second bias network connected to said amplifier for producing a second bias signal proportional to said voice frequency signal, said second bias network being connected to said amplifier for suppressing the operation of said amplifier when the voice frequency signal exceeds a predetermined amount, a third bias network connected to said microphone amplifier for producing a third bias signal when said microphone produces a voice frequency signal exceeding a minimum amount, said third bias network being connected to the second valve for interrupting the operation of the first bias network when said voice frequency signal exceeds a minimum amount.

6. An apparatus for use in the instruction of speaking comprising a thermionic generator of noise signal, a first thermionic grid control valve connected thereto for interrupting the transmission of said noise signal, a first amplifier connected to said valve for amplifying said noise signal when said noise signal is transmitted and a sound reproducer connected to the first amplifier for producing a noise sound responsive to such noise signal when the signal is transmitted, a second grid control thermionic valve and a first bias network connected thereto for producing a negative bias when said second valve is conducting, said first bias network being connected to the grid of the first valve for biasing said valve to non-conducting condition when said second valve is in conducting condition, a microphone for generating a voice frequency signal, a second amplifier connected to said microphone for amplifying the voice frequency signal, a second bias network connected to said amplifier for producing a second bias signal when the amplified voice signal exceeds a predetermined amount, said second bias network being connected to the first amplifier for interrupting the operation of said first amplifier when said voice signal exceeds a predetermined amount, a third bias network connected to said second amplifier for producing a third bias, said third bias network being connected to the grid of the second valve for interrupting conductivity of said second valve, after the amplified voice signal has exceeded a predetermined lower minimum value.

7. The apparatus of claim 6 further characterized in that each of said bias networks comprises a grid control thermionic tube having the output thereof coupled by a capacitance to a network, said network including a smoothing circuit and a rectifier.

8. The apparatus of claim 6 further characterized in that said first amplifier is a two-stage amplifier, the first stage of which is grid controlled and has the grid connected to the output of the second bias network.

WILLIAM S. HOWELL.
JOHN V. IRWIN.

References Cited in the file of this patent

UNITED STATES PATENTS

| Number | Name | Date |
|---|---|---|
| 2,194,559 | Koch | Mar. 26, 1940 |
| 2,392,218 | Anderson | Jan. 1, 1946 |
| 2,501,327 | Good | Mar. 21, 1950 |